United States Patent
Yamada

(10) Patent No.: US 7,786,869 B2
(45) Date of Patent: Aug. 31, 2010

(54) RADIO COMMUNICATION SYSTEM

(75) Inventor: Toshimichi Yamada, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 367 days.

(21) Appl. No.: 12/075,968

(22) Filed: Mar. 15, 2008

(65) Prior Publication Data

US 2008/0238658 A1    Oct. 2, 2008

(30) Foreign Application Priority Data

Mar. 27, 2007    (JP) .............................. 2007-080661

(51) Int. Cl.
G08B 13/14    (2006.01)
G08B 26/00    (2006.01)
H04Q 5/22    (2006.01)
(52) U.S. Cl. .................... 340/572.1; 340/505; 340/10.6
(58) Field of Classification Search ........................ None
See application file for complete search history.

(56) References Cited

U.S. PATENT DOCUMENTS

| | | | |
|---|---|---|---|
| 4,766,295 A | * | 8/1988 | Davis et al. .................. 235/383 |
| 5,572,653 A | * | 11/1996 | DeTemple et al. ........... 345/501 |
| 5,910,653 A | * | 6/1999 | Campo .................. 250/214 AL |
| 6,282,177 B1 | * | 8/2001 | Ostermiller et al. ......... 370/278 |
| 2007/0069883 A1 | * | 3/2007 | Collier et al. ................ 340/538 |

FOREIGN PATENT DOCUMENTS

JP        2005-165814 A    6/2005

* cited by examiner

Primary Examiner—Daniel Wu
Assistant Examiner—Mark Rushing
(74) Attorney, Agent, or Firm—AdvantEdge Law Group, LLC

(57) ABSTRACT

There is provided a radio communication system including a first transceiver equipped with an antenna circuit and a transmitting-receiving unit and for transmitting a data signal by an electromagnetic wave, and a second transceiver equipped with an antenna circuit, a transmitting-receiving unit, a memory unit for storing the data signal, a display unit having display memory property, and a power source unit for obtaining an operation voltage for each unit from the electromagnetic wave. The first transceiver relatively varies the transmission output of the data signal to a high level or a low level, and the second transceiver receives the data signal and stores the data signal in the memory unit when the level of the transmission output of the data signal is low, and sends the data signal from the memory unit to the display unit when the level of the transmission output of the data signal is high.

5 Claims, 7 Drawing Sheets

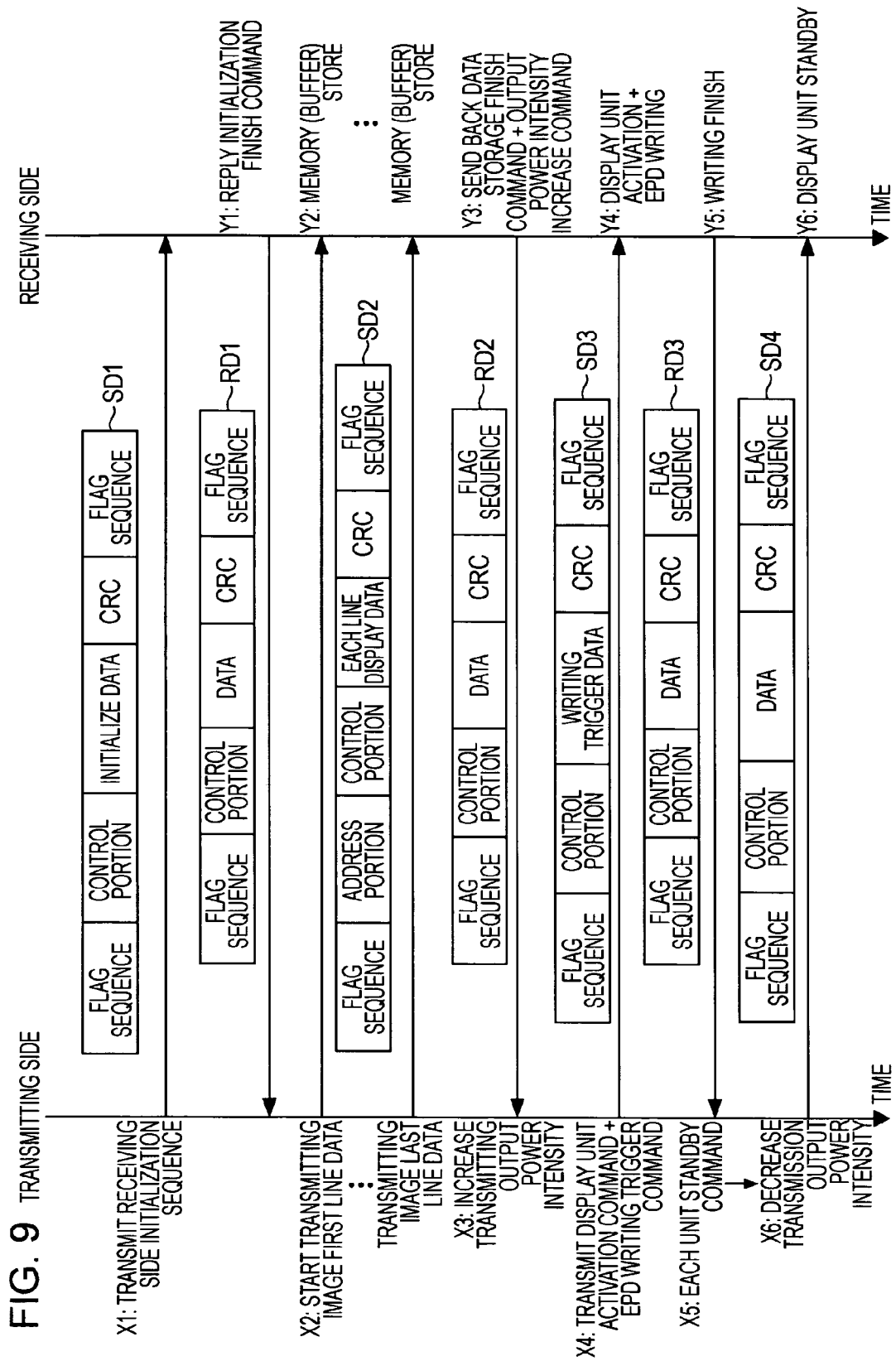

RADIO COMMUNICATION SYSTEM

BACKGROUND

1. Technical Field

The present invention relates to a radio communication system for supplying operation power and a data signal by an electromagnetic wave (electric wave) from another radio device to a radio terminal device such as a RF-ID (Radio Frequency IDentification) tag system, a non contact type IC card system, and the like. In particular, the present invention relates to a radio communication system or the like which reduces electric power consumption in a radio terminal system when a radio terminal device is equipped with an indicator consuming large electric power.

2. Related Art

Development of a RF-ID device has been advanced as a substitution of a bar code and the like. Some of the RF-ID device incorporates an electric battery and some does not. The RF-ID device which does not incorporate an electric battery is activated by receiving supply of electric power by an electromagnetic wave such as a carrier wave from outside to transmit and receive data to and from an outer device. The typical application of the RF-ID device is a tag for merchandise management. Alternatively, an information display terminal and the like to which the RF-ID technology is applied has been considered. However, when an indicator is attached to the RF-ID device which does not incorporate an electric battery, supply of electric power to the RF-ID device is stopped when the RF-ID device is gone out from the range within which an electric wave from a radio device (information post) for providing a display information is reached or radio communication is finished. In this case, it is impossible to continue display. Consequently, for example, in the RF-ID device described in JP-A-2005-165814, using of so called an electronic paper display (EPD) having a property (display memory property) for keeping a display state even when power source is turned off as an indicator is proposed. A driving voltage about, for example, 10 volt is required for the EPD. In the RF-ID device, the driving power of the EPD indicator is considerably larger than that of another circuit, so that devices have been made in order to obtain a required indicator driving power and device driving power by, for example, providing a power receiving antenna for driving the indicator, driving a communication unit and a display unit in a time division manner, providing a large scale stepwise booster circuit.

As described above, the RF-ID device receives power supply from an external information post or the like by an electromagnetic coupling (electric wave) to be operated. Accordingly, operation power supply to the RF-ID device can be increased by increasing the radiation power of the information post.

However, the radio emission level should be reduced as much as possible as the radio emission may cause noise, communication failure, and the like. Further, there exists output regulation by the Radio Law. Further, not only the reduction of the electric power consumption of the RF-ID device, but also the reduction of the electric power consumption of the whole of the RF-ID device system is preferable.

SUMMARY

An advantage of some aspects of the invention is to provide a radio communication system which makes it possible to reduce electric power consumption in a radio terminal system using a radio terminal equipped with an information indicator or to provide a radio communication system having high electric power using efficiency.

According to an aspect of the invention, there is provided a radio communication system that includes a first transceiver equipped with an antenna circuit and a transmitting-receiving unit and for transmitting a data signal by an electromagnetic wave and a second transceiver equipped with an antenna circuit, a transmitting-receiving unit, a memory unit for storing the data signal, a display unit having display memory property, and a power source unit for obtaining an operation voltage for each unit from the electromagnetic wave. The first transceiver relatively varies the transmission output of the data signal to a high level or a low level, and the second transceiver receives the data signal and stores the data signal in the memory unit when the level of the transmission output of the data signal is low, and sends the data signal from the memory unit to the display unit when the level of the transmission output of the data signal is high.

Further, it is preferable that the first transceiver sets the gain property of the antenna circuit to a wide band property when the level of the transmission output of the data signal is low and sets the gain property of the antenna circuit to a narrow band property when the level of the transmission output of the data signal is high.

Further, it is preferable that the first transceiver sets the transmission gain property of the transmitting-receiving unit to a wide band property when the level of the transmission output of the data signal is low and sets the transmission gain property of the transmitting-receiving unit to a narrow band property when the level of the transmission output of the data signal is high.

Further, it is preferable that the second transceiver sets the gain property of the antenna circuit to a wide band property when the level of the transmission output of the data signal is low and sets the gain property of the antenna circuit to a narrow band property when the level of the transmission output of the data signal is high.

Further, it is preferable that the operation of the second transceiver is controlled by a data signal from the first transceiver.

According to the structure, excessive electric power supply from the transceiver when the transceiver is operated with low electric power consumption can be prevented, and the using efficiency of the transmission power can be improved. Further, the using efficiency of transmission power can be further improved as the band property of the transmission system is varied to a wide band low gain property or a narrow band high gain property in accordance with the variation of the electric power supply. Further, the operation including display of a portable indicator can be conveniently controlled by, for example, a control software for an information post by enabling control of the operation of the second transceiver by a data signal from the first transceiver.

BRIEF DESCRIPTION OF THE DRAWINGS

The invention will be described with reference to the accompanying drawings, wherein like numbers reference like elements.

FIG. 9 is a flow chart illustrating a third operational example of the system.

DESCRIPTION OF EXEMPLARY EMBODIMENTS

Hereinafter, an embodiment of the invention will be described with reference to the accompanying drawings.

Figure 1:
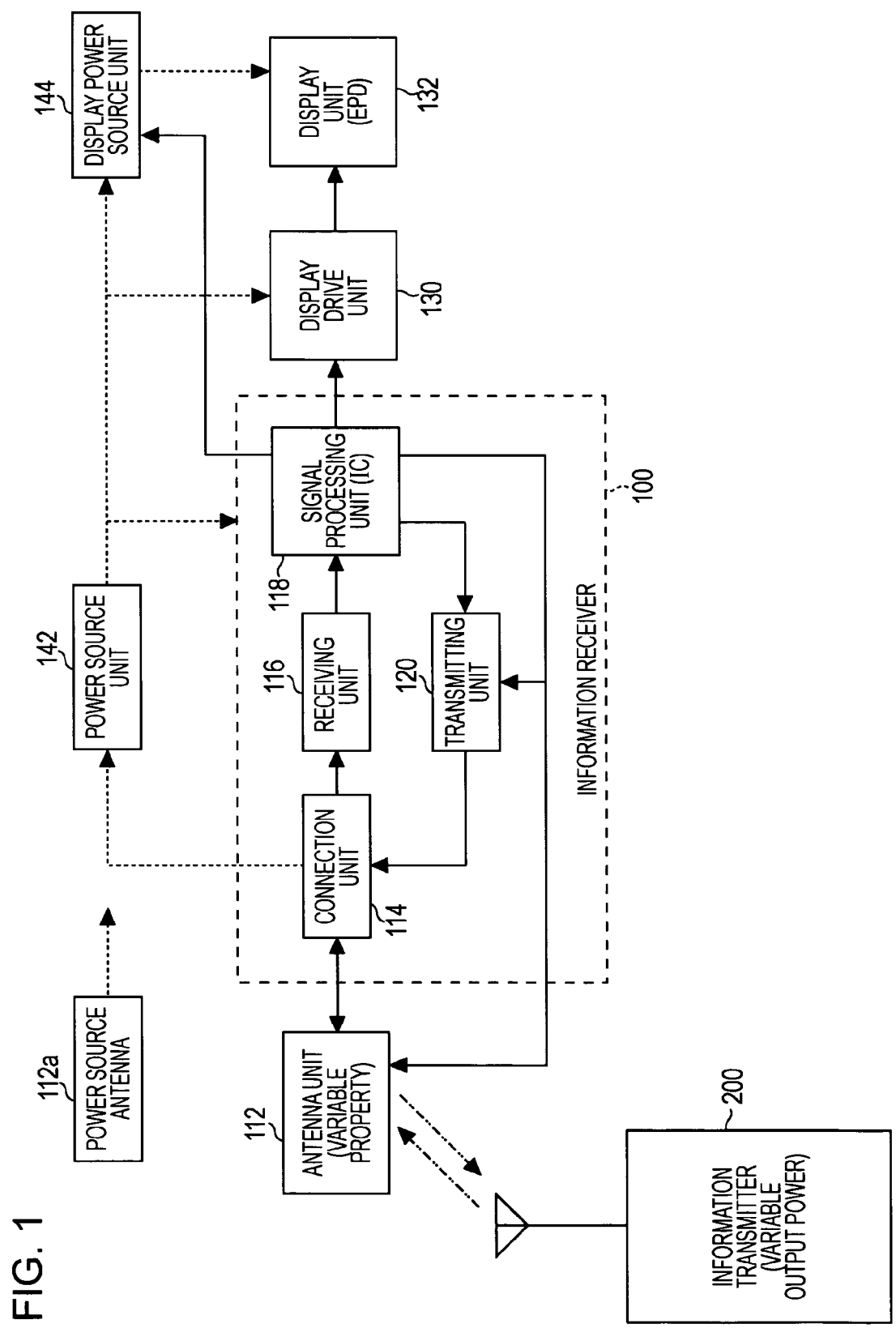
FIG. 1 is a block diagram illustrating a structure of an information receiver.
Figure 2:
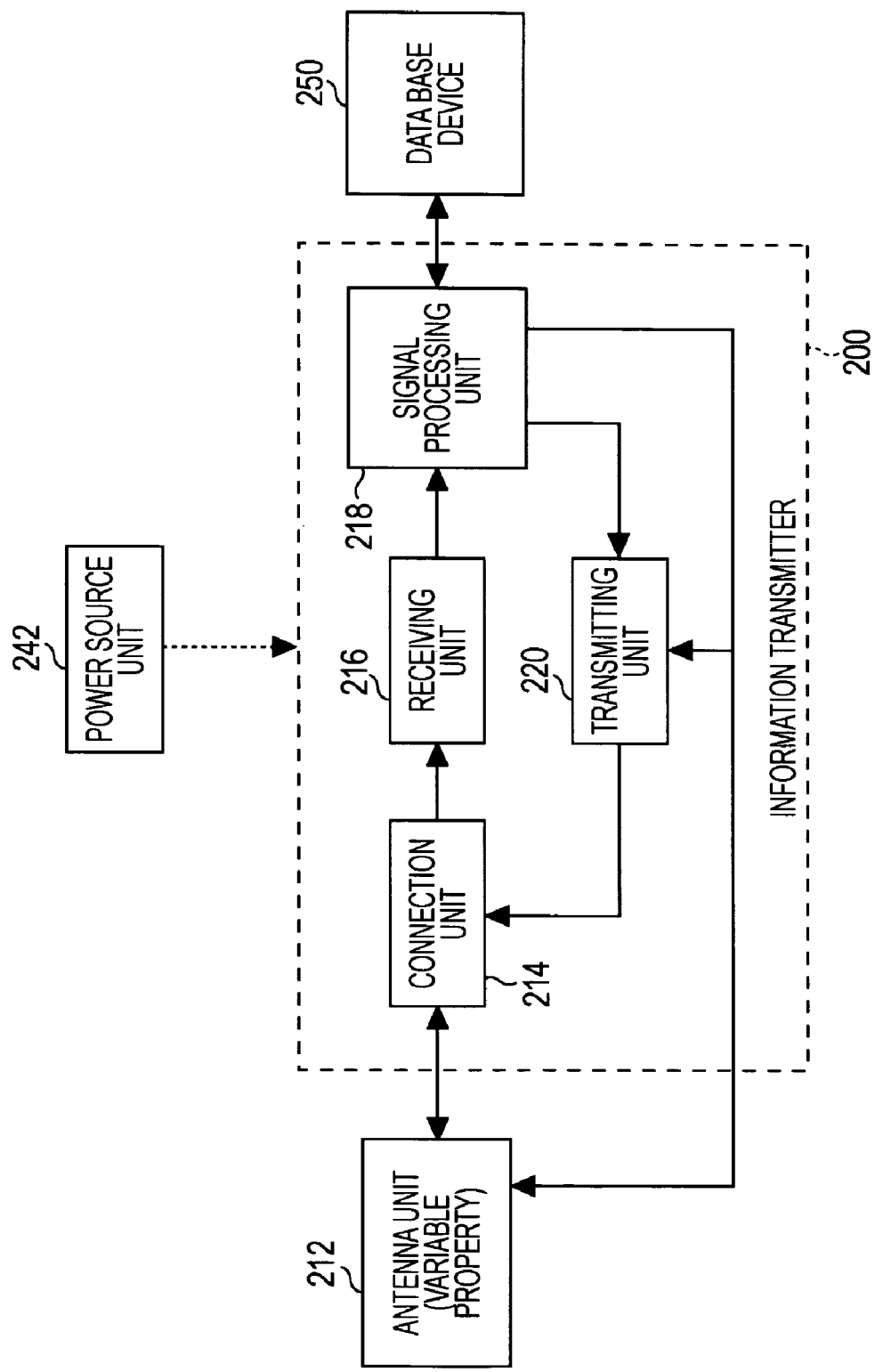
FIG. 2 is a block diagram illustrating a structure of an information transmitter.

FIG. 1 shows an information receiver corresponding to a radio terminal equipped with an indicator among a radio terminal system according to the embodiment of the invention. FIG. 2 shows an information transmitter corresponding to an information post for providing information among the radio terminal system.

In the embodiment, efficiency of electric power supply is provided by varying the radio transmission power from the information transmitter to the information receiver in a display data transmission step and in a writing step of display data on an indicator. Further, a high speed data transmission system having a wide band property is constituted between the information transmitter and the information receiver in order to perform data communication at a high speed in the display data transmission step, and a low speed data transmission system which enables power transmission of a narrow band property and a high efficiency during the other communication. Further, as another embodiment, a transmitting antenna and a receiving antenna for power supply are separately provided in addition to an antenna for data signal transmission.

In a circuit block of the information receiver shown in FIG. 1, an antenna unit 112 receives a radio signal from an information transmitter 200. Further, the antenna unit 112 transmits a high frequency signal received from a transmitting unit 120 to the information transmitter 200 as a radio signal.

Figures 4A, 4B:
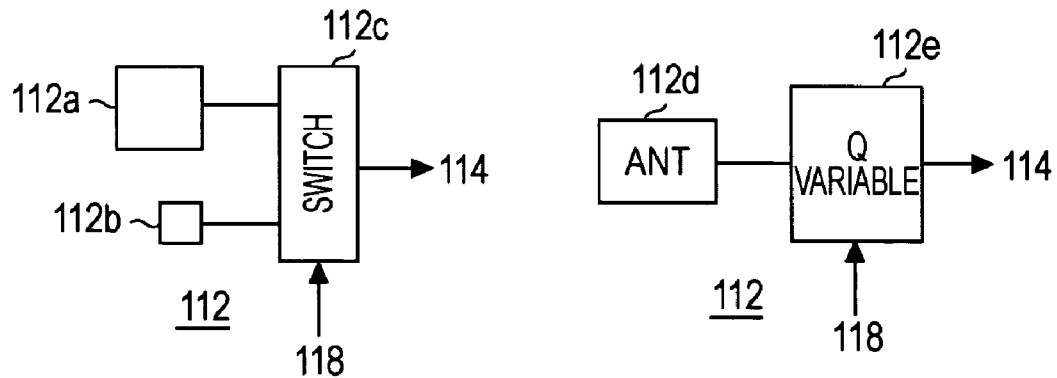
FIG. 4A and FIG. 4B are each a block diagram illustrating a structure of an antenna unit.

As shown in FIG. 4A, the antenna unit 112 is constituted by an antenna 112a having a narrow band high gain property (high acutance Q) synchronized with a carrier frequency, an antenna 112b having a wide band low gain property (low acutance Q) for receiving a modulated signal frequency band, and a switch 112c for selecting the output of the both antennas in accordance with a control signal from a signal processing unit 118 to relay to a connection unit 114 of the latter part.

Note that, as shown in FIG. 1 as 112a, an antenna 112a dedicated for receiving electric power may be separately provided to always connect to a power source unit 142.

Further, in the example shown in FIG. 4B, the antenna unit 112 is constituted by the combination of an antenna 112d and a Q property variable circuit 112e for varying reception sensitivity characteristic. The Q property variable circuit 112e varies the reception sensitivity characteristic of the antenna to a wide or narrow range by varying a parameter such as, for example, a resistance, an inductance, a capacitance of a tank circuit (tuning circuit) in accordance with a control signal from the signal processing unit 118.

The connection unit 114 transmits a data signal (modulation signal) component among a high frequency signal received by the antenna unit 112 to a receiving unit 116. Further, the connection unit 114 transmits a carrier signal component among the received high frequency signal to the power source unit 142. Further, the connection unit 114 transmits a modulation signal (transmit signal) from the transmitting unit 120 described below to the antenna unit 112.

The receiving unit 116 demodulates the modulation signal to restore a data signal described below. The data signal is transmitted to a signal processing unit 118. The power source 142 is constituted by a rectification circuit and a smoothing circuit and generates a direct-current power source voltage by rectifying the career signal. The direct-current power source voltage becomes an operation power source of a transmitting and receiving system shown by a dotted line frame in FIG. 1, a display drive unit 130, and the like. Further, the direct-current power source voltage is supplied to a display power source unit 144 and the voltage is raised, and supplied to a display unit 132 as a driving voltage of, for example, 10 V of an EPD.

Figure 3:
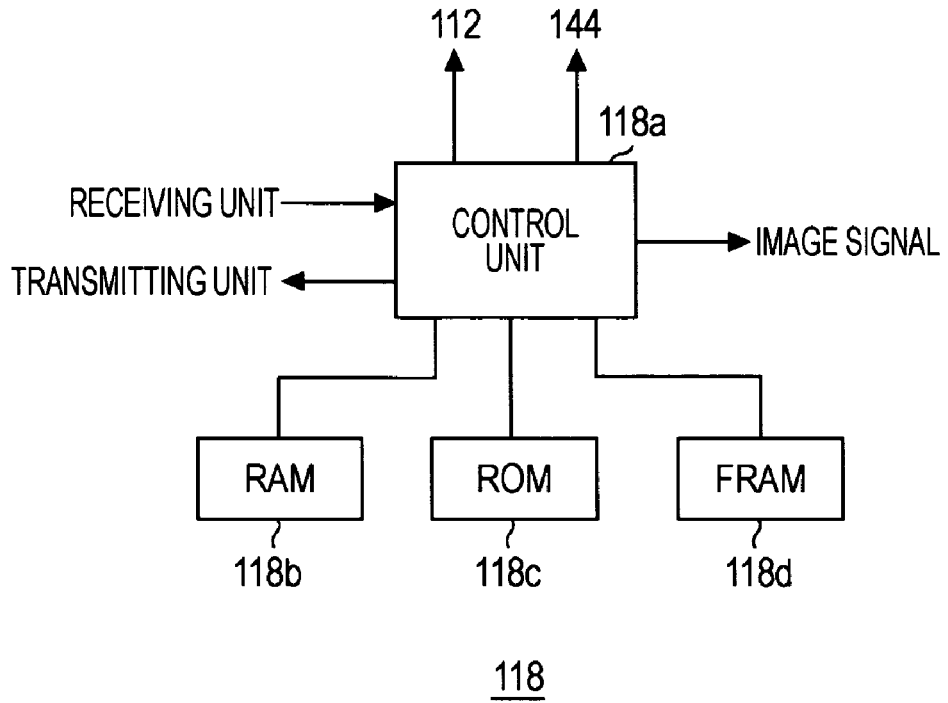
FIG. 3 is a block diagram illustrating a structure of a signal processing unit.

As shown in FIG. 3, the signal processing unit 118 is constituted by a control section 118a for performing control operation of each unit and signal processing in accordance with a control program, a RAM 118b for temporally storing a restored data signal, a ROM 118c for storing a control program, a fixed data, a command signal, and the like, an FeRAM 118d (EEPROM or the like may be alternatively used) as a nonvolatile memory capable of rewriting for storing a control parameter received from an information transmitter 200, and the like. The control section 118a (signal processing unit 118) reads out a command signal received from the information transmitter 200 from a received data signal and performs the control operation of each unit corresponding thereto. For example, transmission of a data signal (command) to the information transmitter 200 via the transmitting unit 120, switching of transmitting operation/receiving operation, operation control of the display power source unit 114, and the like are included. Further, the control section 118a supplies a data signal (image signal) stored in the RAM 118b to the display drive unit 130.

The display drive unit 130 converts a data signal of each pixel to a level signal and supplies the level signal to the display unit 132 equipped with the EPD for performing a two dimensional display.

Figure 5:
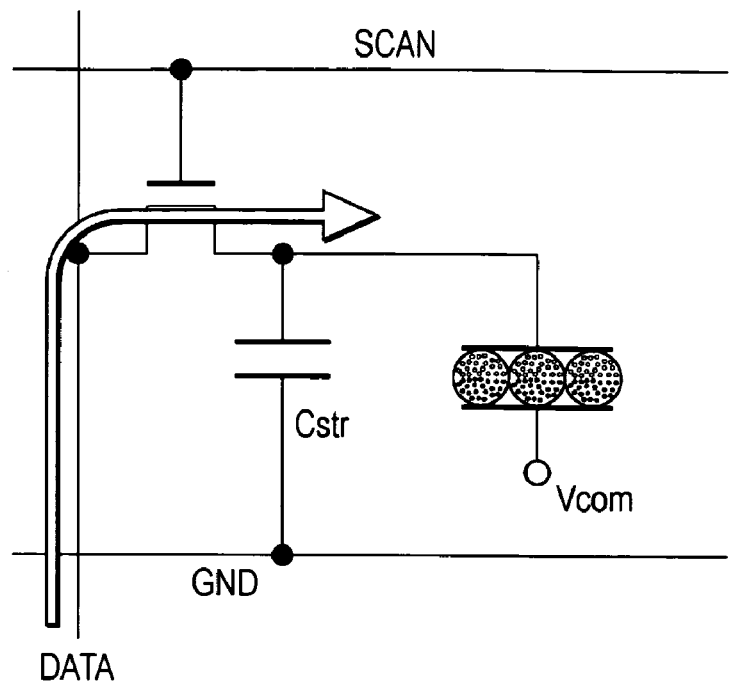
FIG. 5 is a diagram illustrating a unit pixel of an EPD

An example of a unit pixel circuit of the active matrix FPD constituting the display unit 132 is shown in FIG. 5. As a structure of the EPD, a capacitor structure is employed in which a microcapsule in which fine particles are enclosed is sandwiched by a lower portion electrode and an upper portion ITO transparent electrode. When writing to the EPD pixel, a retention capacity Cstr and an EPD pixel portion is charged to the power source voltage to the pixel selected by a scanning line SCAN and a data line DATA. Writing on the EPD is the same to charge a capacitance for each time scanning is performed on a scanning line SCAN, so that the electric power consumption during driving the EPD shows an instantaneous pulse shape.

Figure 6:
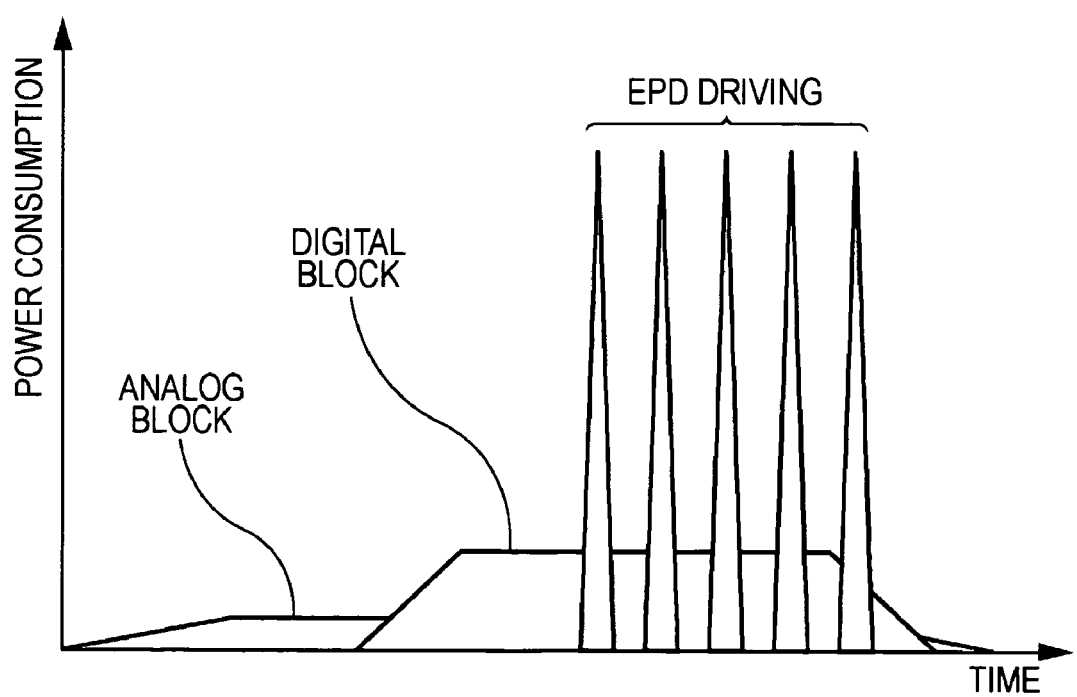
FIG. 6 is a diagram illustrating electric power consumption of the information receiver using the EPD.

FIG. 6 shows a state of the electric power consumption from when the information receiver 100 is activated to when the information receiver 100 displays the information of a data signal. The electric power consumption of the transmitting and receiving system (analog block) and the electric power consumption of the signal processing unit (digital block) are relatively small. However, high electric power consumption is generated in a pulse manner for each time data is written in the pixels of each scanning line of the EPD.

Accordingly, when the electric power supply from the information transmitter 200 is a constant amount, it is required to set the transmission power from the information transmitter 200 to exceed the maximum value of the electric power consumption in order to stably operate the system. Accordingly, the efficiency in the use of electric power is lowered as the most of the transmission power is not used except when driving the EPD. Further, when the electric power consumption of the information receiver 100 exceeds the electric power supplied from the information transmitter 200 during writing on the EPD, the power source voltage of another electric power system is lowered and the function of the EPD display drive unit 130, the signal processing unit 118, and the like operated by the another electric power system is stopped. Note that output electric field intensity during communication is stipulated in the Radio Law, so that the electric power supply from the information transmitter 200 is also restricted.

FIG. 2 shows an example of the structure of the information transmitter 200. In FIG. 2, an antenna unit 212 transmits a radio signal to the information receiver 100. Further, the antenna unit 212 receives a radio signal from the information receiver 100. The antenna unit 212 may have a similar circuit structure as shown in FIGS. 4A and 4B as described above. Accordingly, the antenna unit 212 can vary the band property to a wide or narrow band. The antenna 212 becomes a high gain antenna when the band property is narrow and a low gain antenna when the band property is wide. In this regard, when the information transmitter 200 is used for a guide post in a museum, the information transmitter 200 is a fixed station (fixed radio station), so that, unlike the information receiver 100, larger and high efficiency antennas as compared with the antennas 112a, 112b, 112d can be used.

The connection unit 214 transmits a data signal (modulation signal) component among a high frequency signal received by the antenna unit 212 to a receiving unit 216. Further, the connection unit 214 transmits a modulation signal (transmit signal) from the transmitting unit 220 to the antenna unit 212.

The receiving unit 216 demodulates the modulation signal to restore a data signal. The data signal is transmitted to a signal processing unit 218. A power source unit 242 is constituted by a rectification circuit and a smoothing circuit and generates a direct-current power source voltage by rectifying a commercial power source not shown. The direct-current power source voltage becomes an operation power source of a transmitting and receiving system (analog system) shown by a doted line frame in FIG. 2, a signal processing system (digital system), and the like.

The signal processing unit 218 has the structure similar to that of the signal processing unit 118 described above by referencing FIG. 3, so that the description thereof will be omitted. The signal processing unit 218 reads out a command signal transmitted from the information receiver 100 from the received data signal to perform control operation of each unit corresponding thereto. For example, transmission of a data signal (command) to the information receiver 100 via the transmitting unit 220, switching of transmitting operation/receiving operation, switching of the transmission power, and the like are included. Further, the signal processing unit 218 stores a guide information (display data) transmitted from a data base device 250 in a RAM 118b, transforms the guide information into a form of a data signal, and supplies the transformed guide information to the transmitting unit 220.

The data base device 250 is, for example, constituted by a personal computer system not shown, and accumulates guide information (display information) and the like in the hard disc. The data base device 250 transmits a pertinent data to the signal processing unit 218 in response to the access of the information receiver. Note that the display not shown of the personal computer system functions as an information display of the information transmitter 200.

The transmitting unit 220 modulates a carrier signal of, for example, 13.56 MHz by a data signal supplied from the signal processing unit 218 to form a high frequency signal. For example, the specification of RF-ID may be applied for the modulation type. A power amplifier not shown of the transmitting unit 220 can vary the band property of the amplifier to a wide or narrow band in accordance with the control signal from the signal processing unit 21. When the amplifier has a narrow band property, a high gain property is obtained and the transmit power of a high frequency signal supplied to the antenna unit 212 is increased. Further, when the amplifier has a wide band property, a low gain property is obtained and the data signal can be transmitted at a higher speed although the transmit power of a high frequency signal supplied to the antenna unit 212 is decreased. As described above, the band property of the antenna unit 212 is also varied to a wide or narrow band in accordance with a control signal from the signal processing unit 218.

Next, an operation example of the radio terminal system equipped with the indicator described above will be described.

Figure 7:
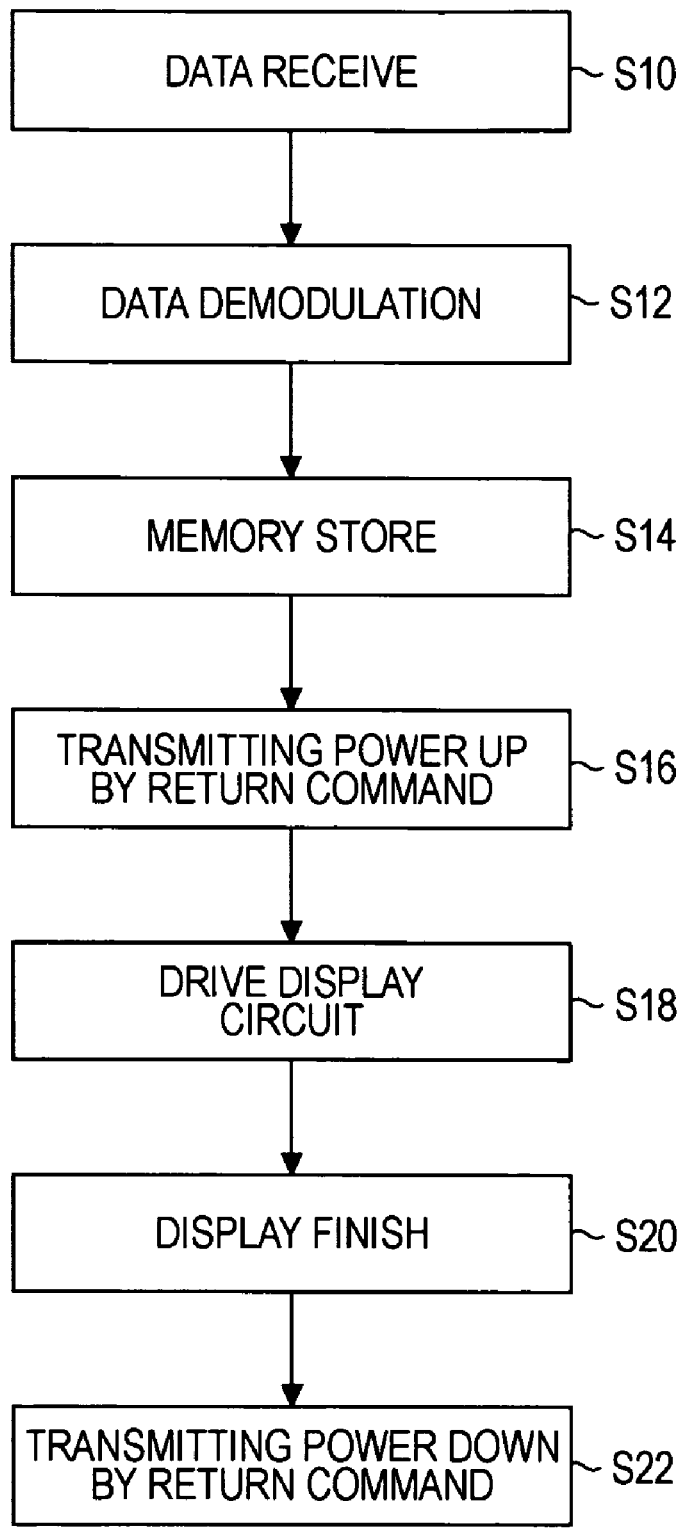
FIG. 7 is a flow chart illustrating a first operational example of a system.

FIG. 7 is a flow chart schematically illustrating a first operational aspect. In the example, the transmit power of the information transmitter 200 is optimally switched by the operation timing at the information receiver 100 side. The information receiver 100 receives a data signal from the information transmitter 200 (S10), and demodulates the data (S12). When a display data is extracted from the demodulated data signal and stored in the memory (S14), a command indicating to increase the transmit output is transmitted from the information receiver 100 to the information transmitter 200 (S16). Preferably, an unnecessary portion of the circuit of the information receiver 100 is set to a standby state to save the electric power consumption. The display power source unit 144 is activated to drive the display unit 132 when the output of the power source unit 142 is increased by the increase of the transmit output of the information transmitter 200 (S18). When writing in each pixel of the EPD display circuit is finished (S20), a command indicating to decrease the transmit output is transmitted to the information transmitter 200 from the information receiver 100 to lower the transmit power of the information transmitter 200 (S22).

The output voltage of each power source circuit unit 142, 144 may be always monitored by the control unit after the transmission power is raised by the command to the information receiver 200. When the power source voltage is decreased, the writing on the EPD indicator may be stopped and a command for raising the transmission output may be transmitted to the information transmitter 200. When the power source voltage is restored, the writing on the EPD indicator may be restarted.

Figure 8:
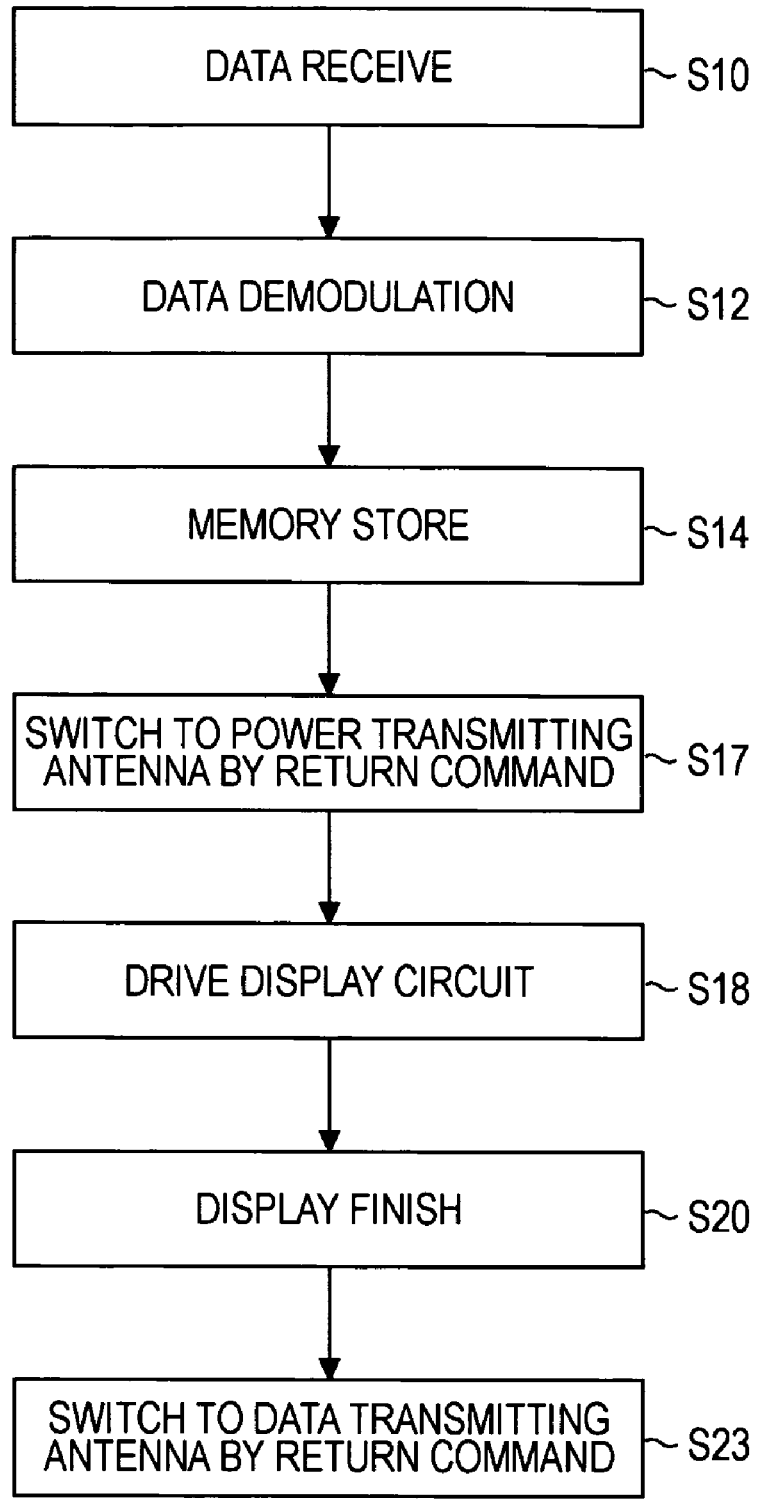
FIG. 8 is a flow chart illustrating a second operational example of the system.

FIG. 8 is a flow chart schematically illustrating a second operational aspect. The same reference numeral is used to denote the same step as that in FIG. 7 in FIG. 8.

In this example, the data signal communication antenna 112b and the electric power transmitting and receiving antenna 112a for receiving only a carrier are prepared. The data signal communication antenna 112b is used when receiving a data signal. After data demodulation is finished, switched to the electric power transmitting and receiving antenna 112a to be used.

That is, initially, the information transmitter 200 and the information receiver 100 use the data signal communication antenna 112b. The information receiver 100 receives a data signal from the information transmitter 200 by the data signal communication antenna 112b (S10), and demodulates the data (S12). When a display data is extracted from the demodulated data signal and stored in the memory (S14), the information receiver 100 transmits a command indicating to switch the antenna to the information transmitter 200. The information receiver 100 switches to the electric power transmitting and receiving antenna 112a from the data signal communication antenna 112b (S17). Preferably, an unnecessary portion of the circuit of the information receiver 100 is set to a standby state to save the electric power consumption. When the output of the power source unit is increased by the increase of the radiation power from the information transmitter 200 and the improvement of the receiving efficiency in the information receiver 100, the display power source unit 144 is activated to drive the display unit 132 (S18). When the writing in each pixel of the EPD display circuit is finished (S20), a command for indicating to switch the antenna is transmitted to the information transmitter 200 from the information receiver 100 and the information receiver 100 is also switched to the data signal receiving antenna 112b (S22).

FIG. 9 is a traffic diagram schematically illustrating a third operational aspect. In FIG. 9, the left side longitudinal axis shows operations of the information transmitter 200 in a chronologic order. The right side longitudinal axis of FIG. 9 shows operations of the information receiver 100 in a chronologic order. An example of data signals is shown between the both axes.

In the embodiment, the radio drive output for data writing and the radio drive output for display writing are separated as means for providing efficiency when driving the EPD by a radio drive. Further, a high speed data communication transmission system and a power transmitting transmission system are separately used.

First, the information transmitter 200 transmits a data signal SD1 of a receive initialize sequence to the information receiver 100 side by superimposing on a carrier signal when detected that the information receiver 100 exists in a communication range by some sort of means. The data signal is, for example, a packet data as shown in FIG. 9 and is constituted by a flag sequence (start flag), a control portion, an information portion, a frame check sequence, and a flag sequence (finish flag). An error check such as a CRC system, a parity check, or the like can be employed for the frame check sequence. The data signal SD1 of the receive initialize sequence includes an initialize data for indicating initialization in the information portion (X1).

The property of the antenna unit 112 is to be set to a narrow band by the selection of the antenna or the selection of Q property of the antenna in the normal state in the information receiver 100. Herewith, the power source voltage can be efficiently generated from a capacitor gain signal. When the data signal SD1 is received, the information receiver 100 initializes each unit and sends back (transmits) a data signal RD1 containing an initialization finish command in the information portion of the packet to the information receiver 200. Reading out of the ID of the receiving circuit is included in the initialization. The information receiver 100 sets the property of the antenna unit 112 to a wide band property by the selection of the antenna or by the selection of the Q property of the antenna in preparation for high speed data transmittance (Y1).

When the initialization finish command is received, the information transmitter 200 sets the property of the antenna unit 212 to a wide band property, also sets the band property of the transmitting unit 220 to a wide band gain property, and transmits a data signal SD2 for transmitting an image data for EPD display at a high speed. A lot of information is included in the data signal SD2, so that it is preferable that the data is transmitted at a high speed. An address of each line is stored in the address portion of the data signal SD2 and a pixel data group of each line is stored in the information portion. The pixel data groups from the first line to the last line are sequentially transmitted for each one line by the data signal SD2 (X2).

When each data signal SD2 is received, the information receiver 100 sequentially stores the each data signal SD2 in the memory 118b. When storing of all the data signal SD2 is finished, the information receiver 100 sends back a data signal RD2 including an output raise command for indicating the raise of the intensity of the transmission electric wave to the information receiver 200. Further, the information receiver 100 sets the property of the antenna unit 112 to a narrow band high gain property (Y3).

The information transmitter 200 receives the data signal RD2, sets the property of the antenna unit 212 to a narrow band high gain property, and also sets the transmission property of the transmitting unit 220 to a narrow band high gain property to increase the transmission output (X3).

Next, the information transmitter 200 transmits a data signal SD3 containing a display activation command and an EPD writing trigger command in the information portion to the information receiver 100 (X4).

When the data signal SD3 is received, the information receiver 100 activates the display drive unit 130, the display power source unit 144 and writes the image data stored in the memory 118b on the display unit 132 (Y4).

When the writing of the image data is finished, the information receiver 100 transmits a data signal RD3 including a writing finish command in the information portion to the information transmitter 200 (Y5).

When the data signal RD3 is received, the information transmitter 200 transmits a data signal SD4 including an each unit standby command for setting each unit of the information receiver 100 to a waiting state in the information portion to the information receiver 100 (X5).

When the data signal SD4 is received, the information receiver 100 inactivates the display drive unit 130, the display power source 144, and the display unit 132 to set to a waiting state (Y6).

Thereafter, the information transmitter 200 lowers the transmission output (X6).

As described above, in the embodiment of the invention, a radio drive output for data writing to the memory 118b and a radio drive output for data writing on the EPD indicator from information transmitter 200 are separated in order to improve using efficiency of transmission power when the information receiver 100 equipped with the EPD indicator 132 is driven by radio. Herewith, excessive electric power supply from the information transmitter 200 when the information receiver 100 is operated with low electric power consumption can be prevented, and the using efficiency of the transmission power can be improved.

Further, the using efficiency of transmission power can be further improved as the band property of the transmission system is varied to a wide band low gain property or a narrow band high gain property in accordance with the variation of the electric power supply.

Further, according to the structure of the embodiment, the information receiver 100 is controlled by a command of the information transmitter 200. Accordingly, the invention is preferable to the system such as an information post (information transmitter) that provides various information corresponding to the place where the information receiver 100 exists.

The information receiver 100 is operated by the transmission output of the information transmitter 200 in the embodiment. However, it should be noted here that the information receiver 100 may be equipped with an auxiliary power source such as a rechargeable battery.

Further, the antenna dedicated for power transmission may be always connected to the power source unit. Increasing the communication speed of image data transmission deteriorate power transmission efficiency as a wide band is required for the frequency property of the antenna. In addition, the upper limit of transmission power during data communication is stipulated in the Radio Law. Consequently, a system having high power transmission efficiency is provided by setting an antenna dedicated for power transmission and by deriving the antenna in synchronization with the operation of the display function of the receiver.

In the embodiment, the EPD indicator is used as an example of a portion relatively requiring electric power. However, the similar system can be provided even when another device relatively consuming high electric power which has no display function is connected to the information receiver.

What is claimed is:

1. A radio communication system comprising:
    a first transceiver equipped with an antenna circuit and a transmitting-receiving unit and for transmitting a data signal by an electromagnetic wave; and
    a second transceiver equipped with an antenna circuit, a transmitting-receiving unit, a memory unit for storing the data signal, a display unit having display memory property, and a power source unit for obtaining an operation voltage for each unit from the electromagnetic wave, wherein
    the first transceiver relatively varies the transmission output of the data signal to a high level or a low level, and
    the second transceiver receives the data signal and stores the data signal in the memory unit when the level of the transmission output of the data signal is low, and sends the data signal from the memory unit to the display unit when the level of the transmission output of the data signal is high.

2. The radio communication system according to claim 1, wherein the first transceiver sets the gain property of the antenna circuit to a wide band property when the level of the transmission output of the data signal is low and sets the gain property of the antenna circuit to a narrow band property when the level of the transmission output of the data signal is high.

3. The radio communication system according to claim 1, wherein the first transceiver sets the transmission gain property of the transmitting-receiving unit to a wide band property when the level of the transmission output of the data signal is low and sets the transmission gain property of the transmitting-receiving unit to a narrow band property when the level of the transmission output of the data signal is high.

4. The radio communication system according to claim 1, wherein the second transceiver sets the gain property of the antenna circuit to a wide band property when the level of the transmission output of the data signal is low and sets the gain property of the antenna circuit to a narrow band property when the level of the transmission output of the data signal is high.

5. The radio communication system according to claim 1, wherein the operation of the second transceiver is controlled by a data signal from the first transceiver.

\* \* \* \* \*